(12) United States Patent
Jensen

(10) Patent No.: US 7,005,818 B2
(45) Date of Patent: Feb. 28, 2006

(54) MOTOR ACTUATOR WITH TORQUE CONTROL

(75) Inventor: Jens Moeller Jensen, Toftlund (DK)

(73) Assignee: Danfoss A/S, (DK)

(*) Notice: Subject to any disclaimer, the term of this patent is extended or adjusted under 35 U.S.C. 154(b) by 24 days.

(21) Appl. No.: 10/472,566

(22) PCT Filed: Mar. 26, 2002

(86) PCT No.: PCT/DK02/00207

§ 371 (c)(1),
(2), (4) Date: Feb. 23, 2004

(87) PCT Pub. No.: WO02/078146

PCT Pub. Date: Oct. 3, 2002

(65) Prior Publication Data

US 2004/0130281 A1    Jul. 8, 2004

(30) Foreign Application Priority Data

Mar. 27, 2001 (DK) .............................. 2001 00500

(51) Int. Cl.
*H02P 7/00* (2006.01)

(52) U.S. Cl. ..................... 318/432; 318/434; 318/461; 318/280; 318/466

(58) Field of Classification Search ........ 318/280–286, 318/466–469, 432–434, 461; 49/26, 28
See application file for complete search history.

(56) References Cited

U.S. PATENT DOCUMENTS

| 4,455,012 A | * | 6/1984 | Gupta ................... 251/129.05 |
| 5,040,331 A | * | 8/1991 | Merendino et al. ............ 49/25 |
| 5,265,590 A | * | 11/1993 | Takagi .......................... 601/52 |
| 5,929,580 A | * | 7/1999 | Mullet et al. ................ 318/466 |
| 6,118,243 A | * | 9/2000 | Reed et al. .................. 318/468 |

FOREIGN PATENT DOCUMENTS

| EP | 0 090 152 A1 | 2/1983 |
| EP | 0 590 227 A1 | 2/1993 |
| JP | 11-266591 A | 9/1999 |

* cited by examiner

Primary Examiner—Rina Duda
(74) Attorney, Agent, or Firm—Buchanan Ingersoll PC

(57) ABSTRACT

In a motor actuator, e.g., a valve actuator, comprising a reversible electrical motor, a drive circuit is providing a stop function, when the torque of the motor exceeds a predetermined maximum torque. The drive circuit is constructed as a two-terminal circuit connected in series with the reversible electrical motor, and the electrical power is supplied to the series connection with a mainly fixed voltage VCC and a polarity which provides the desired rotational direction of the motor. This provides the possibility of having the drive circuit positioned close to the motor and maintaining full torque control and stop function with two wire connections.

19 Claims, 2 Drawing Sheets

MOTOR ACTUATOR WITH TORQUE CONTROL

TECHNICAL FIELD

The present invention relates to a motor actuator having a reversible electrical motor and a drive circuit that provides a stop function for the motor when the torque of the motor exceeds a predetermined maximum torque.

BACKGROUND ART

In motor actuators of this kind, it is known to provide a torque control by sensing the current to the motor and disconnecting the supply to the motor when the measured current exceeds a predetermined value. A motor actuator of this kind is e.g. known from U.S. Pat. No. 4,455,012, in which it is further described that a timing circuit provides a possibility of having higher starting currents than the predetermined maximum current value. This described construction of the control system is intended to be positioned remotely from the controlled motor actuator, which is connected to the controller by two wires. If a feedback for the absolute position of the valve is needed, a potentiometer or digitizer is suggested, requiring two further wires for the connection to the controller.

DISCLOSURE OF THE INVENTION

The present invention provides a motor actuator of the kind referred to above, with which it is possible to have the control of the motor actuator positioned close to the motor or even integrated with the motor, and still providing a torque control and stop function, and wherein the connection to a centralized control system is provided by two wires. In an embodiment of the invention, the motor actuator can be fully remotely controlled with respect to its direction of rotation in a simple manner by simply applying a mainly fixed voltage with appropriate polarity to the two connecting wires, and having the drive circuit fully controlling the torque and the stop function of the motor actuator.

BRIEF DESCRIPTION OF THE DRAWINGS

In the following detailed part of the present description, the invention will be explained in more detail with reference to the exemplary embodiments of a motor actuator according to the invention shown in the drawings, in which.

DESCRIPTION OF THE PREFERRED EMBODIMENTS

Figure 1:
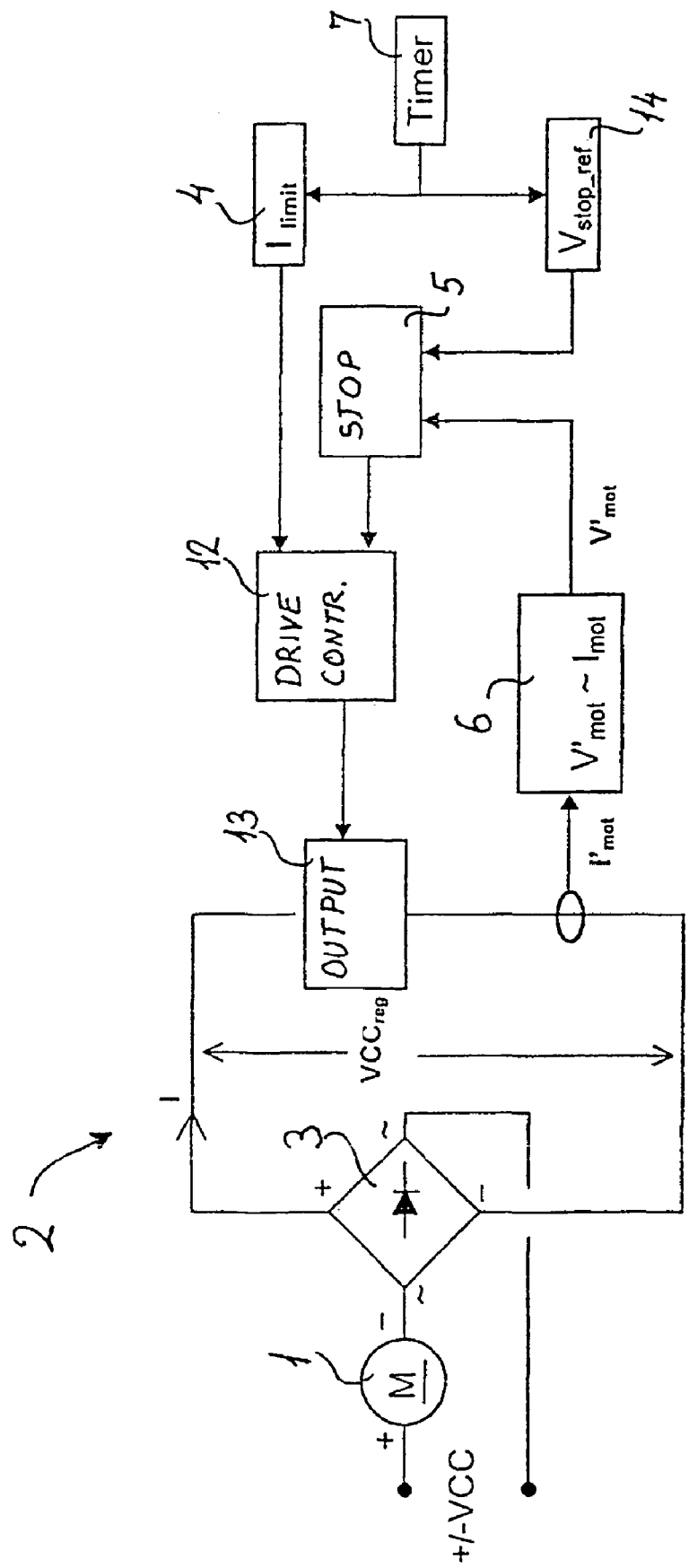
FIG. 1 shows a schematic block diagram of a preferred embodiment of the motor actuator.
Figure 2:
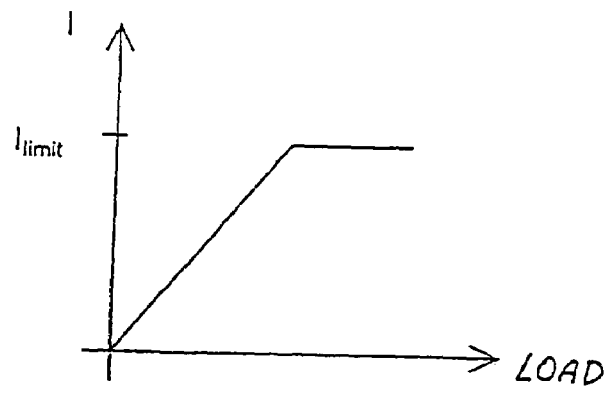
FIG. 2 shows the current limiting function in the motor actuator in FIG. 1, and FIGS. 3 and 4 show how the motor actuator is connected to a centralized controller in a simple on/off controller configuration in FIG. 3 and a more advanced microprocessor control with position control in FIG. 4.

The motor actuator shown in FIG. 1 comprises a reversible electrical motor 1 and a drive circuit 2. The motor 1 receives its current from a supply VCC and is connected in series with the drive circuit 2, which controls the motor as described below. The drive circuit 2 comprises a rectifier 3 ensuring that the current I in the drive circuit is always in the same direction independent of the polarity of the applied voltage VCC. The current I is controlled by an output circuit 13. The drive circuit 2 controls the current I based on measurements of the regulated voltage $VCC_{reg}$ and the measured current I indicated as $I'_{mot}$. A maximum current $I_{limit}$ is set in a current limiter 4 and is compared to the measured current $I'_{mot}$. The output circuit 13 delivers a current I to the motor 1 which is limited by this maximum current $I'_{limit}$. As shown in FIG. 2, the current consumption of the motor 1 is dependent on the load on the motor or in other words the torque delivered by the motor and until a maximum current is reached, he current is as shown proportional to the load. After reaching the maximum current limit $I_{limit}$, the drive control 12 controls the output circuit 13 in such a way that only this maximum current is delivered to the motor 1.

This means that the voltage $VCC_{reg}$ is increasing and when this voltage reaches a stop reference voltage $V_{stop\_ref}$, as indicated in the stop voltage reference 14, the stop circuit 5 is activated and deactivates the drive controller 12, whereby the output circuit 13 is deactivated and no current is delivered to the motor. The reaching of the stop voltage corresponds to the load rising to a certain level, which would normally correspond to the motor actuator having reached a mechanical stop at one of the ends of its travel. Thus, the motor will be stopped when reaching such an end of travel. In order to be able to start up the motor 1, a timer 7 is included, which upon application of the voltage VCC inhibits the functioning of the stop circuit 5 and the current limiting function 4 during a start-up period corresponding to the short surge current drawn by the motor 1 during such start-up.

The motor 1 can be connected to e.g. a valve stem through a suitable gear mechanism in order to transform the high-speed low torque from the motor to a suitable low speed high torque needed for such a valve control.

From the above, it can be seen that the output circuit 13 will be able to adjust the current I, which is approximately proportional to the torque of the motor, said control being performed through a control signal from the drive control 12. The drive control 12 bases this control on the inputs from the current limiter 4 and the stop function 5 in such a way that the motor actuator is driven at a maximum but limited by the current limit $I_{limit}$, as shown in FIG. 2. When the load on the motor is increasing, the current will increase correspondingly but will be limited by the maximum current $I_{limit}$, whereby the maximum torque is limited leading to a controlled reaching of a possible end of travel position. The stop function 5 reacts on the voltage $VCC_{reg}$, which is dependent on the voltage over the motor 1, and uses a stop voltage reference 14 to provide a stop of the motor actuator when the motor voltage becomes sufficiently low corresponding to a stop of the motor and a corresponding high current in the motor limited by the current limiter 4. The motor will draw a current higher than $I_{limit}$ during start-up. In order to be able to start up the motor, the stop functions and the current limiter 4 are deactivated by the timer 7 during such a start-up interval. The timer 7 is activated when the voltage VCC is applied in order to activate the motor actuator.

When a voltage VCC is applied to the motor actuator, the full voltage will from the start be applied to the drive circuit 2, the motor ideally functioning as a short circuit when stopped and not generating any counter-electromotive force. After a short time period, the drive circuit 2 will be activated and the timer 7 will start and inhibit the stop function 5 and the current limiter 4. Hereby the output circuit 13 will deliver the current necessary to start up the motor. As soon as the motor starts running, it will generate a counter electromotive force, whereby the applied voltage VCC will be shared between the motor 1 and the drive circuit 2.

After a certain time, set in the timer, the current limiter 4 and stop function 5 are allowed to function, and as long as everything proceeds as normal, the current in the motor will now be below $I_{limit}$ set by the current limiter 4. When the motor actuator meets a certain resistance, the current will be raised and this will continue until the maximum current $I_{limit}$ is reached, whereupon a constant current equal to $I_{limit}$ is supplied to the motor 1. Due to the fact that the motor does not receive the necessary current for the load, the motor will reduce its revolutions and the voltage over the motor will fall, whereby the voltage $VCC_{reg}$ will rise. When this voltage reaches the limit set in the stop voltage reference 14, $V_{Stop\_ref}$, the stop function 5 will be activated and shut down for the current to the motor via the drive control 12 and the output circuit 13. Thus, the drive circuit has secured a limitation of the torque and a soft stop at the end of travel. After this stopping, an insignificant current will naturally be present in the series connection of the motor 1 and the drive circuit 2 in order to supply power to the drive circuit 2.

Figure 3:
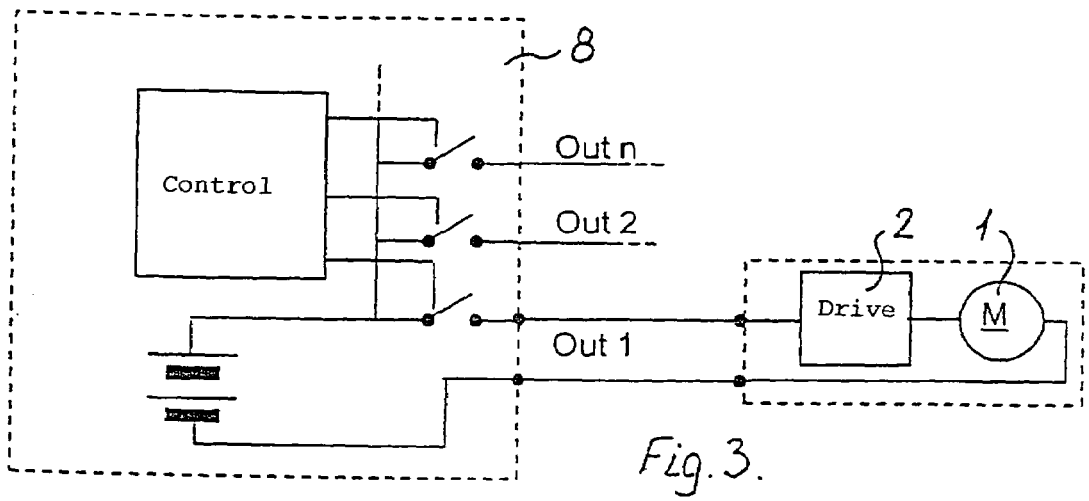

The centralized controller 8 shown in FIG. 3 comprises several outputs Out 1–n for controlling several motor actuators. With the integrated motor 1 and drive circuit 2, the centralized controller 8 can be a simple relay control applying the necessary voltage VCC to the individual motor actuators with the required polarity to obtain the desired rotation of the motor 1.

Figure 4:
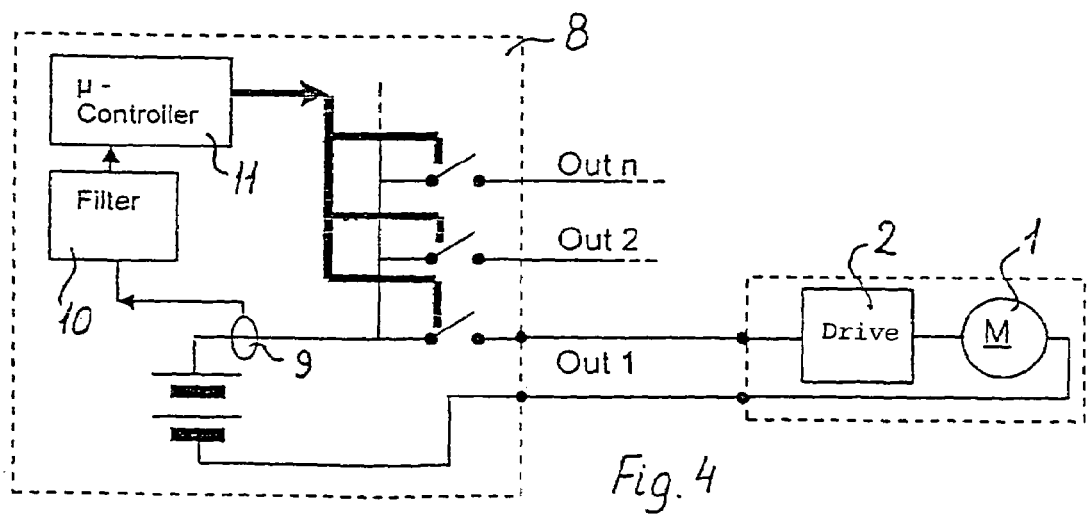

In FIG. 4 is shown a more sophisticated centralized controller 8 comprising a current sensor 9 measuring the current delivered to the motor actuator presently being supplied with a voltage VCC. The current sensor 9 measures this current and delivers a signal to a filter circuit 10, which detects the ripple of the current and filters this ripple to obtain a sequence of impulses, the frequency of these impulses being proportional to the motor speed and the number of impulses thus being an indication for the relative position of the motor actuator. It is especially convenient to choose a motor 1 with an uneven number of poles, whereby the ripple will be more distinct and easier to detect by the filter 10. The filter 10 is connected to a micro-controller 11, which is able to use the impulses received from the filter to calculate the relative position of each of the individual motor actuators taking into account the parameters thereof, such as gear ratio on a possible gear mechanism on the motor, the number of poles on the motor, etc. In order to have secure control of the position of the individual motor actuator, it will naturally be necessary to provide a zero position detection by e.g. controlling the motor actuator to a well-defined end of travel position. After such a zero position setting, the absolute position of the motor actuator can be calculated by the microprocessor 11, based on counting of impulses with applied positive and negative voltages, respectively.

The above system described in connection with FIG. 4 will thus be able to provide a centralized registration and control of the relative position of several independent motor actuators without any extra input/output ports for positioning signals from the individual motor actuators.

As can be seen in FIGS. 3 and 4, the motor actuators and their connections to the centralized controller 8 are the same in both situations only using two wires for the connection. Furthermore, the detection or measurement of the ripple current 9 and filtering 10 necessary for the position control of the motor actuators are positioned centrally in the centralized controller 8, which makes the costs of producing such a system relatively low.

Although the invention above has been described in connection with preferred embodiments thereof, it will be evident to one of ordinary skill in the art that several modifications can be provided without deviating from the concepts covered by the following claims.

What is claimed is:

1. A motor actuator, comprising
a reversible electrical motor having an input from a mainly fixed voltage and having an output, and
a drive circuit providing a stop function, when the torque of the motor exceeds a predetermined maximum torque wherein:
said drive circuit being constructed as a two-terminal circuit having a first terminal connected in series with the output of the reversible electrical motor, and electrical power being supplied to a second terminal with the mainly fixed voltage (Vcc) and a polarity which provides the desired rotational direction of the motor.

2. Motor actuator in accordance with claim 1, wherein said drive circuit being integrated with the motor.

3. Motor actuator in accordance with claim 1 wherein said drive circuit comprising a rectifier for providing the same direction of current (I) in a controlling circuit thereof, irrespective of the polarity of the applied voltage (Vcc).

4. Motor actuator in accordance with claim 1, wherein said drive circuit comprising a torque control implemented as a current limiter limiting the current in the motor to a predetermined maximum current ($I_{limit}$).

5. Motor actuator in accordance with claim 4, wherein said stop function being provided by means of a voltage detection, detecting the voltage ($VCC_{reg}$) over the drive circuit and cutting off the current (I) to the motor when this voltage ($VCC_{reg}$) increases above a predetermined level.

6. Motor actuator in accordance with claim 4 wherein said drive circuit further comprising a timer function for disabling at least one of the torque control current limiter and the stop function during motor start-up.

7. Motor actuator in accordance with claim 1, wherein said drive circuit comprising a speed control circuit controlling the speed of the motor by controlling the voltage ($VCC_{reg}$) over the drive circuit.

8. Motor actuator in accordance with claim 1, wherein the voltage (VCC) supplied to the series connection of motor and drive circuit being supplied from a centralized controller adapted to control one or more actuators, said centralized controller comprising a current sensor measuring the current delivered to the actuator and a filter circuit connected to receive the current measurement and deducing an impulse signal provided by the current ripple of the motor, when the poles are changed in the motor, the frequency of said impulse signal thus being proportional to the speed of the motor and the number of impulses being a measure for the position of the actuator, and using the impulse signal for at least one of speed and position control of the actuator.

9. A centralized controller for use with a motor actuator in accordance with claim 8, wherein said controller comprising a micro-controller for performing detection and control of the relative position of the actuator.

10. Motor actuator in accordance with claim 1, wherein the motor being a DC-motor with an uneven number of poles.

11. The motor actuator according to claim 1, wherein said drive circuit is directly connected to said reversible electrical motor.

12. A motor actuator, comprising:
a reversible electrical motor, said motor having an input terminal receiving current from a supply voltage and having an output terminal;
a drive circuit having a first terminal connected in series with the output terminal of said reversible electrical motor and having a second terminal connected to said supply voltage, said drive circuit comprising a rectifier and an output circuit, current in said drive circuit being controlled by said output circuit based on a measurement of a regulated voltage across said drive circuit and a measured current in said drive circuit;
a drive control being connected to said output circuit;
a current limiter being connected to said drive control, said current limiter setting a maximum current that can be delivered to said motor;
a stop circuit being connected to said drive control, said stop circuit being activated when said regulated voltage reaches a predetermined reference voltage; and
said drive control cutting off supply of current to said output circuit and therefore to said drive circuit and said motor upon activation of said stop circuit.

13. The motor actuator according to claim 12, further including:
a timer that inhibits the functioning of said current limiter and said stop circuit during a start-up period upon application of said supply voltage to said motor.

14. The motor actuator according to claim 12, wherein said drive circuit is integrated with said motor.

15. The motor actuator according to claim 12, wherein the current in said drive circuit is maintained in the same direction by said rectifier without regard to the polarity of the supply voltage to said motor.

16. The motor actuator according to claim 12, wherein the supply voltage is supplied from a centralized controller, and said centralized controller controls supply voltages to a plurality of motor actuators.

17. The motor actuator according to claim 16, wherein said centralized controller comprises a current sensor, said current sensor measuring current being delivered to one of said motor actuators; and
a filter circuit connected to receive the current measurement from said current sensor, detect a ripple in the current, and filter the ripple to obtain a sequence of impulses, wherein the frequency of the impulses is proportional to the motor speed and provides an indication of the relative position of the motor actuator.

18. The motor actuator according to claim 17, further including a micro-controller connected to said filter, said micro-controller receiving impulses from said filter corresponding to each of said plurality of said motor actuators and calculating the relative position of each of said motor actuators.

19. The motor actuator according to claim 12, wherein said drive circuit is directly connected to said reversible electrical motor.

* * * * *